US011581991B2

(12) United States Patent
Ouchi

(10) Patent No.: US 11,581,991 B2
(45) Date of Patent: Feb. 14, 2023

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/547,683

(22) Filed: Dec. 10, 2021

(65) Prior Publication Data
US 2022/0103315 A1 Mar. 31, 2022

Related U.S. Application Data

(63) Continuation of application No. 16/838,146, filed on Apr. 2, 2020, now Pat. No. 11,228,406.

(30) Foreign Application Priority Data

Apr. 10, 2019 (JP) .............................. JP2019-075030

(51) Int. Cl.
| | | |
|---|---|---|
| H04L 5/00 | (2006.01) | |
| H04B 7/024 | (2017.01) | |
| H04B 7/0417 | (2017.01) | |
| H04B 7/06 | (2006.01) | |
| H04W 92/20 | (2009.01) | |
| H04W 84/12 | (2009.01) | |

(52) U.S. Cl.
CPC ............ *H04L 5/0023* (2013.01); *H04B 7/024* (2013.01); *H04B 7/0417* (2013.01); *H04B 7/0626* (2013.01); *H04L 5/0035* (2013.01); *H04W 84/12* (2013.01); *H04W 92/20* (2013.01)

(58) Field of Classification Search
CPC ... H04L 5/0023; H04L 5/0035; H04L 5/0037; H04L 5/0007; H04B 7/024; H04B 7/0417; H04B 7/0626; H04W 92/20; H04W 84/12
See application file for complete search history.

(56) References Cited

U.S. PATENT DOCUMENTS

| | | | | |
|---|---|---|---|---|
| 2010/0056170 | A1* | 3/2010 | Lindoff ................. | H04L 1/0026 455/452.1 |
| 2013/0114523 | A1* | 5/2013 | Chatterjee ............. | H04L 5/0051 370/329 |
| 2014/0254708 | A1 | 9/2014 | Seo et al. | |
| 2014/0286290 | A1 | 9/2014 | Nagata et al. | |
| 2015/0256306 | A1 | 9/2015 | Kim et al. | |
| 2017/0324527 | A9 | 11/2017 | Chen et al. | |

(Continued)

*Primary Examiner* — Dac V Ha
(74) *Attorney, Agent, or Firm* — Venable LLP

(57) ABSTRACT

A communication apparatus determines, in a case where one or more other communication apparatuses are capable of performing coordinated communication by using a predetermined frequency band, whether or not performing high-speed connection with the one or more other communication apparatuses each operating as an access point is possible, and selects a Joint Transmission communication method on the basis that it is determined that it is possible to perform high-speed connection with the one or more other communication apparatuses each operating as an access point.

12 Claims, 7 Drawing Sheets

(56) References Cited

U.S. PATENT DOCUMENTS

| | | |
|---|---|---|
| 2018/0027580 A1 | 1/2018 | Yoo et al. |
| 2018/0092110 A1 | 3/2018 | Mallik et al. |
| 2018/0263045 A1 | 9/2018 | Zhou |
| 2022/0167409 A1* | 5/2022 | Oteri ................. H04W 74/0816 |

* cited by examiner

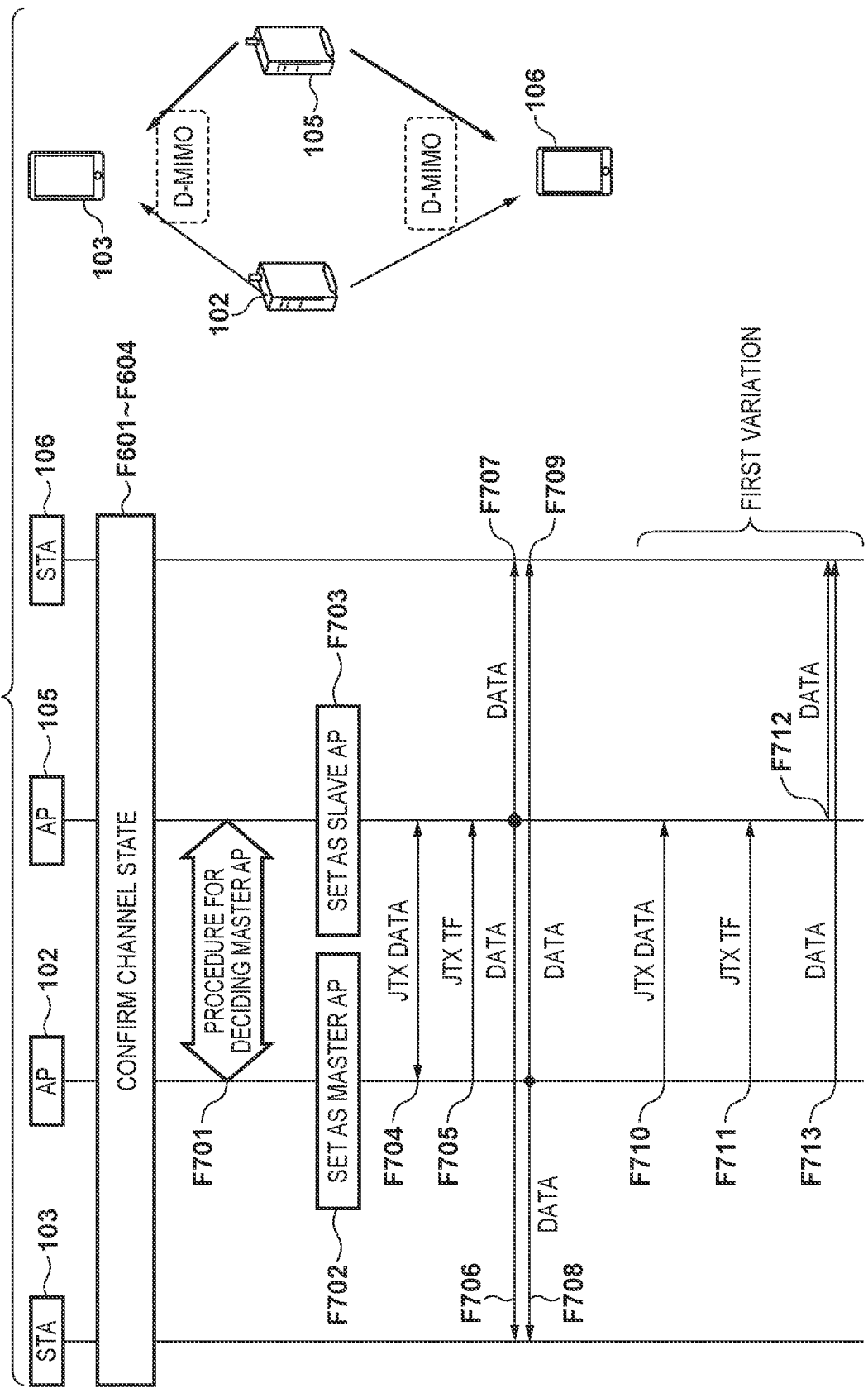

COMMUNICATION APPARATUS, METHOD OF CONTROLLING COMMUNICATION APPARATUS, AND NON-TRANSITORY COMPUTER-READABLE STORAGE MEDIUM

CROSS-REFERENCE TO RELATED APPLICATIONS

This application is a Continuation Application of U.S. patent application Ser. No. 16/838,146, filed Apr. 2, 2020, which claims the benefit of Japanese Patent Application No. 2019-075030, filed Apr. 10, 2019, the entire disclosures of which are hereby incorporated by reference herein.

BACKGROUND OF THE INVENTION

Field of the Invention

The present invention relates to a communication control technique in a wireless LAN.

Description of the Related Art

Standards of the IEEE 802.11 series are known as communication standards related to a wireless LAN (Wireless Local Area Network). An IEEE 802.11ax standard uses OFDMA to achieve high peak throughput as well as improve communication speeds in congested situations. Note that OFDMA is an abbreviation for Orthogonal Frequency-Division Multiple Access. At present, in order to further improve throughput, a Study Group called IEEE 802.11 EHT (Extreme (or Extremely) High Throughput) has been launched in the IEEE as a successor standard to the IEEE 802.11ax standard. As a throughput improvement measure aimed at by IEEE 802.11 EHT, a Multi-AP Coordination configuration in which a plurality of APs (access points) operate by coordinating with each other has been studied. In the multi-AP coordination configuration, since a plurality of APs operate by coordinating with each other, it is possible to perform communication with a connected wireless LAN terminal where the communication is higher speed or stabler than in the case of a single AP. There are a plurality of technical methods for realizing a multi-AP coordination configuration.

Distributed MIMO (Multiple-Input Multiple-Output) (D-MIMO) communication has also been proposed in a wireless LAN environment that conforms to standard of the IEEE 802.11 series (US-2018-263045). D-MIMO is a technique in which a plurality of APs communicate with one wireless LAN terminal at the same timings on the same frequency channel, in which high-speed communication can be realized by multiplexed usage of space.

As described above, there are a plurality of technical methods for realizing a multi-AP coordination configuration. However, it has so far not been proposed how to decide a technical method for realizing a multi-AP coordination configuration in accordance with, for example, a communication condition between communication apparatuses that communicate in the multi-AP coordination configuration.

SUMMARY OF THE INVENTION

In view of the above problems, the present disclosure provides a technique for appropriately deciding a technical method for realizing a multi-AP coordination configuration.

According to one aspect of the present invention, there is provided a communication apparatus which comprises: a first determination unit configured to determine whether or not the communication apparatus and one or more other communication apparatuses capable of performing coordinated communication by coordinating with the communication apparatus to use a predetermined frequency band can obtain channel state information from one or more communication partner apparatuses that perform the coordinated communication; and a selection unit configured to select a communication method for performing the coordinated communication from among a plurality of communication methods based on a result of the determination by the first determination unit.

Further features of the present invention will become apparent from the following description of exemplary embodiments (with reference to the attached drawings).

BRIEF DESCRIPTION OF THE DRAWINGS

FIG. 7 is a sequence chart for describing a JTX (D-MIMO) configuration.

DESCRIPTION OF THE EMBODIMENTS

Figure 1:
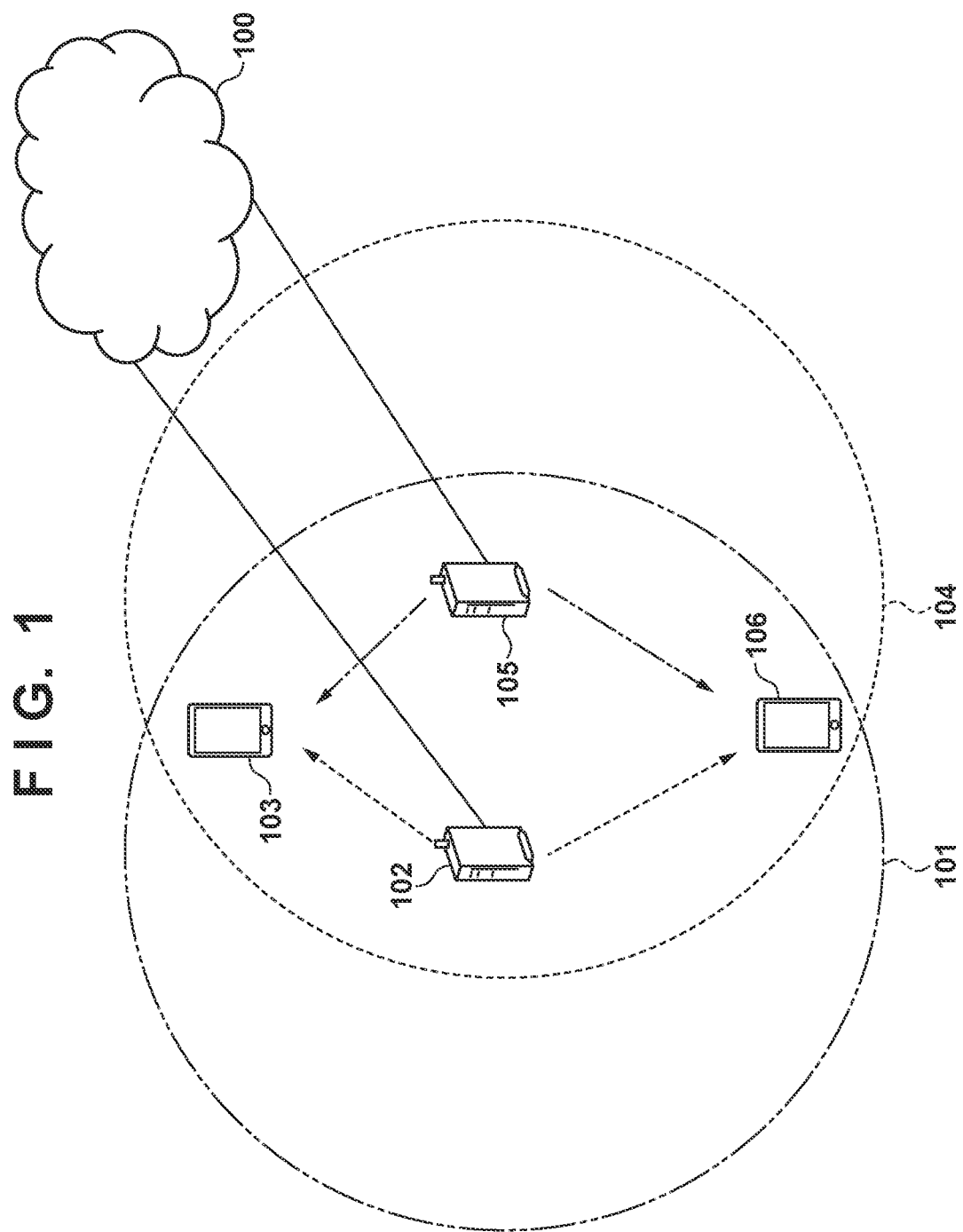
FIG. 1 shows an example of a network configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows a configuration example of a wireless communication network according to the present embodiment. A BSS (Basic Service Set) 1 (BSS1) network managed by an AP (Access Point) 102 is indicated by a two-dot line circle 101. A BSS2 network managed by an AP 105 is indicated by a dashed-line circle 104. STAs (stations) 103 and 106, which are wireless LAN terminals, can maintain connection relationships with a plurality of APs. The APs 102 and 105 and the STAs 103 and 106 are devices (EHT devices) conforming to the IEEE 802.11 EHT (Extreme (or Extremely) High Throughput) standard. The AP 102 and the AP 105 correspond to a multi-AP coordination operation (have a multi-AP coordination function). Between APs having the multi-AP coordination function, one AP can perform coordinated communication by coordinating using a predetermined frequency band with other APs. As a result, higher speed or more stable communication can be realized with respect to a connected wireless LAN terminal than in the case of one AP. Here, a stable state is any combination of a good signal-to-noise ratio, low interference, low delay, and low jitter. As a technical method for realizing the multi-AP coordination function (a multi-AP coordination method), there are various methods as will be described later.

A backhaul 100 is a communication means by which a plurality of APs managing networks of differing BSS communicate with each other. The backhaul 100 may be configured by a wired system such as Ethernet (registered trademark) or a telephone line, or may be configured by a wireless system such as LTE (Long-Term Evolution) or WiMAX (Worldwide Interoperability for Microwave Access). Alternatively, the backhaul 100 may be configured by a wireless LAN of a standard of the IEEE 802.11 series. When the backhaul 100 is configured by such a wireless LAN, this wireless LAN may be the same as or different from wireless channels used between the APs 102 and 105 and the STAs 103 and 106.

It should be noted that the configuration of the wireless communication network shown in FIG. 1 is merely an example for illustrative purposes, and, for example, a network including a large number of EHT devices and legacy devices (communication apparatuses that comply with an IEEE 802.11a/b/g/n/ax standard) in a wider area may be configured. Further, there is no limitation to the arrangement of each communication apparatus shown in FIG. 1, and the following discussion can be applied to the positional relationship of various communication apparatuses.

(AP Configuration)

Figure 2:
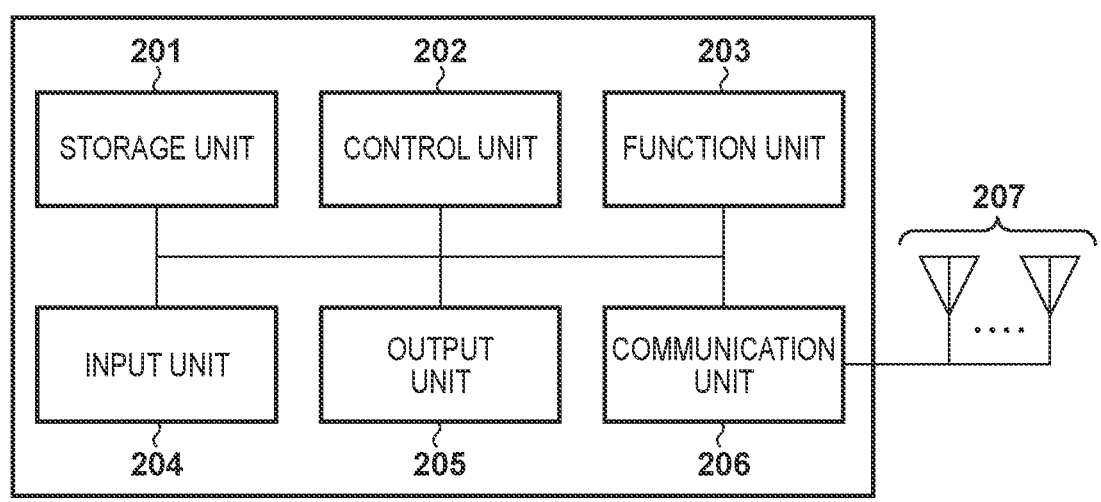
FIG. 2 shows an example of a hardware configuration of an AP.

FIG. 2 is a block diagram showing a hardware configuration of the AP 102. The AP 105 has a similar hardware configuration to that of the AP 102. The AP 102 includes, as an example of its hardware configuration, a storage unit 201, a control unit 202, a function unit 203, an input unit 204, an output unit 205, a communication unit 206, and one or more antennas 207.

The storage unit 201 is configured by a memory such as a ROM or a RAM, and stores a program for performing various operations to be described later, and various information such as communication parameters for wireless communication. As the storage unit 201, a storage medium such as a floppy disk, a hard disk, an optical disk, a magneto-optical disk, a CD-ROM, CD-R, a magnetic tape, a nonvolatile memory card, a DVD, or the like may be used in addition to a memory such as a ROM or a RAM. The storage unit 201 may include a plurality of memories or the like.

The control unit 202 is configured by, for example, a processor such as a CPU or and MPU, an ASIC (application specific integrated circuits), a DSP (digital signal processor), an FPGA (field programmable gate array) or the like. Here CPU is an acronym for Central Processing Unit and MPU is an acronym for Micro Processing Unit. The AP is controlled by executing a program stored in the storage unit 201. The control unit 202 may control the AP 102 in accordance with cooperation between a program stored in the storage unit 201 and an OS (Operating System). In addition, the control unit 202 may include a plurality of processors such as multi-cores to control the AP 102. The control unit 202 controls the function unit 203 to execute predetermined processing such as imaging, printing, and projection. The function unit 203 is hardware for the AP 102 to execute predetermined processing (which can include imaging, printing, projection, and the like).

The input unit 204 accepts various operations from a user. The output unit 205 performs various outputs to a user. Here, output by the output unit 205 includes at least one of display on a screen, sound output by a speaker, vibration output, and the like. It should be noted that both the input unit 204 and the output unit 205 may be realized by one module as in a touch panel.

The communication unit 206 performs control of wireless communication conforming to a standard of the IEEE 802.11 series, control of wireless communication conforming to Wi-Fi (registered trademark), and control of IP (Internet Protocol) communication. Further, the communication unit 206 controls the one or more antennas 207 to transmit and receive wireless signals for wireless communication. The one or more antennas 207 can also be configured to enable D-MIMO (Distributed Multiple-Input Multiple-Output) communication as described below.

Figure 3:
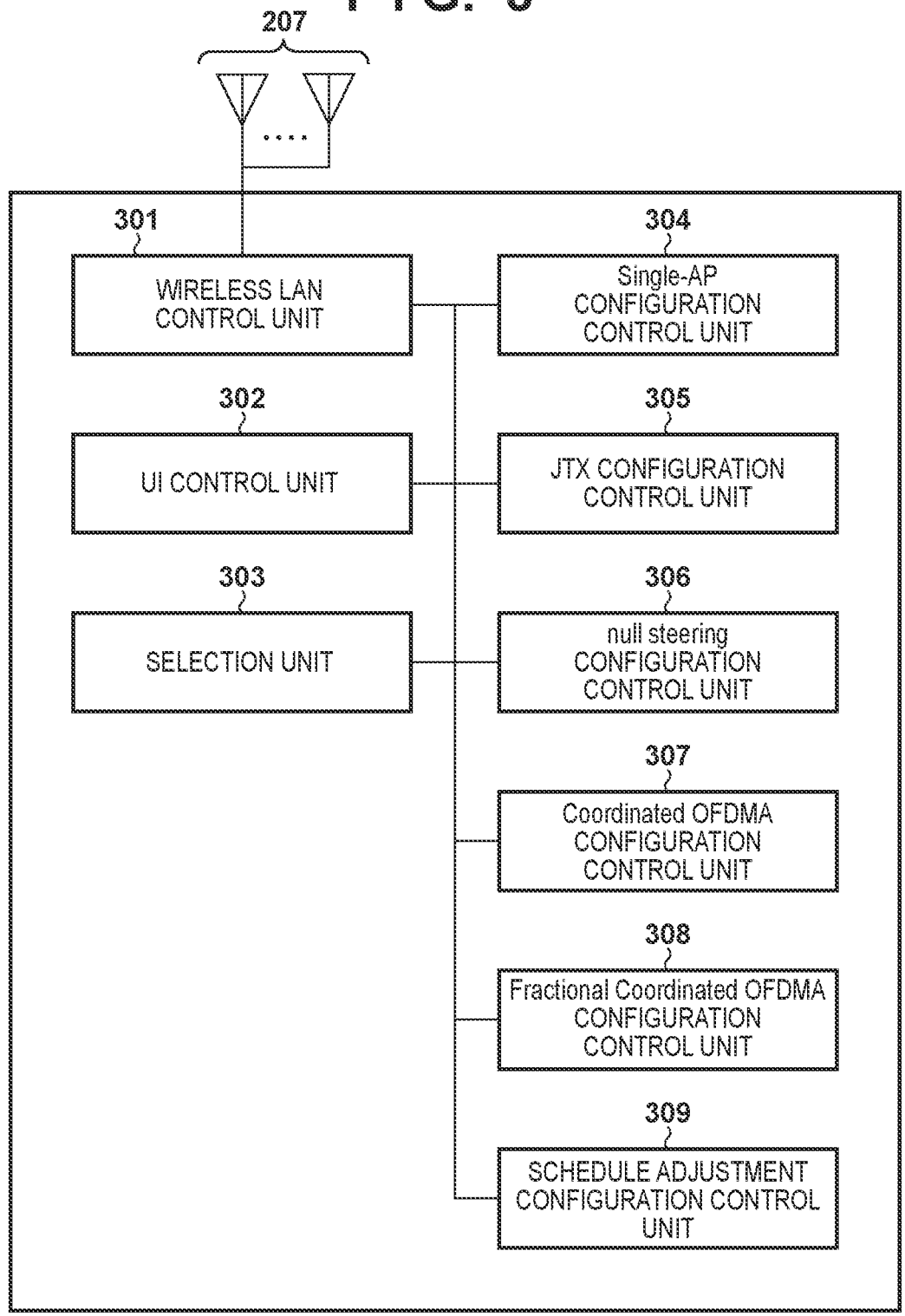
FIG. 3 shows an example of a functional configuration of the AP.

FIG. 3 is a block diagram showing an example of a functional configuration of the AP 102. The AP 105 has a similar functional configuration to that of the AP 102. The AP 102 includes, as an example of its functional configuration, a wireless LAN control unit 301, a UI control unit 302, a selection unit 303, a Single-AP configuration control unit 304, a JTX configuration control unit 305, a null steering configuration control unit 306, a Coordinated OFDMA configuration control unit 307, a Fractional Coordinated OFDMA configuration control unit 308, and a schedule adjustment configuration control unit 309.

The wireless LAN control unit 301 is configured by including a circuit for transmitting and receiving wireless signals to and from another wireless LAN apparatus (for example, another AP or STA) and a program for controlling the circuit. The wireless LAN control unit 301 performs wireless LAN communication control, such as frame generation and frame transmission, reception of a wireless frame from another wireless LAN apparatus, and the like, in accordance with an IEEE 802.11 standard series. The wireless LAN control unit 301 also has a function of analyzing received wireless frames and determining whether or not a predetermined condition is satisfied based on information included in the wireless frames.

The UI control unit 302 receives an operation with respect the input unit 204 (FIG. 2) by a user (not shown) of the AP 102, and performs control for conveying a control signal corresponding to the operation to respective components and control for output (including display) with respect to the output unit 205 (FIG. 2).

The selection unit 303 selects (decides) a communication method in accordance with the AP 102 in response to a result of the analysis/determination by the wireless LAN control unit 301. Details of the operation of the selection unit 303 will be described later with reference to FIG. 4. When a Single-AP method is selected by the selection unit 303, the Single-AP configuration control unit 304 performs communication control for realizing a configuration according to the method. When a JTX (Joint Transmission) method is selected by the selection unit 303, the JTX configuration control unit 305 performs communication control for realizing a configuration according to the method. When a null steering method is selected by the selection unit 303, the null steering configuration control unit 306 performs communication control for realizing a configuring according to this method. When a Coordinated OFDMA method is selected by the selection unit 303, the Coordinated OFDMA configuration control unit 307 performs communication control for realizing a configuration according to the method. When a Fractional Coordinated OFDMA method is selected by the selection unit 303, the Fractional Coordinated OFDMA configuration control unit 308 performs communication control for realizing the configuration according to the method. When a schedule adjustment method is selected by the selection unit 303, the schedule adjustment configuration control unit 309 performs communication control for realizing a configuration according to this method. The operation of the Single-AP configuration control unit 304, the JTX configuration control unit 305, the null steering configuration control unit 306, the Coordinated OFDMA configuration control unit 307, the Fractional Coordinated OFDMA configuration control unit 308, and the schedule adjustment configuration control unit 309, which are function units, will be described later.

(STA Configuration)

The hardware configuration of the STAs 103 and 106, which are communication partner apparatuses of the APs 102 and 106, can be a similar configuration to the hardware configuration of the AP 102 (FIG. 2). That is, the STAs 103 and 106 can each be configured to include a storage unit 201, a control unit 202, a function unit 203, an input unit 204, an output unit 205, a communication unit 206, and one or more antennas 207. Although the functional configuration of the STAs 103 and 106 is not illustrated, it can be configured so that communication is possible by a configuration according to a communication method selected by the AP 102.

(Processing Flow)

Figure 4:
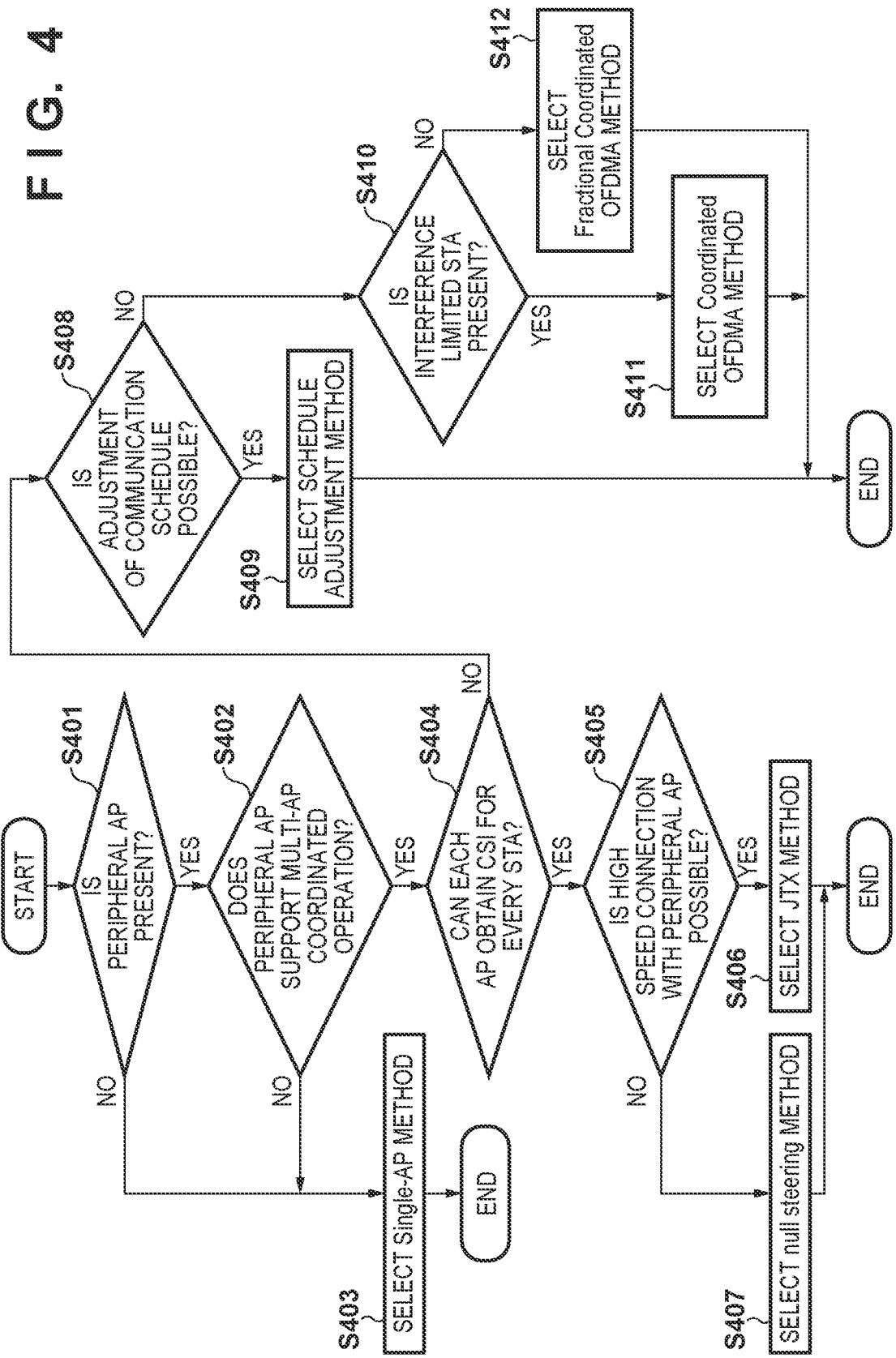
FIG. 4 is a flow chart of processing executed by an AP.

Next, a flow of processing executed by the AP configured as described above will be described. FIG. 4 shows a flow chart of a communication method selection process executed by the AP 102. The processing shown in FIG. 4 can be performed at a timing when the AP 102 establishes a BSS1 network (circle 101 in FIG. 1) or at any time during BSS1 network operation. The flow chart shown in FIG. 4 can be realized by the control unit 202 of the AP 102 executing a control program stored in the storage unit 201, executing calculation and processing of information, and executing control of respective hardware.

In step S401, the wireless LAN control unit 301 of the AP 102 performs confirmation and searches for whether there is an AP (a peripheral AP) that is present in the periphery of the AP 102. Here, a peripheral AP refers to an AP capable of wired or wireless communication with the AP 102. A procedure for confirmation and searching include a passive procedure for receiving a Beacon frame in wireless communication or receiving a frame by broadcast/multicast in wired communication, and an active procedure for transmitting an inquiry frame. In the case of the network configuration of FIG. 1, the AP 102 discovers the AP 105 as a peripheral AP as a result of the confirmation and the search.

If a peripheral AP cannot be discovered (No in step S401), the process proceeds to step S403. In step S403, the selection unit 303 selects the Single-AP method, and ends the process. A Single-AP configuration is a configuration where, in a case where an AP operates and manages a BSS network, the control of another AP is not required. When the Single-AP configuration is selected, the Single-AP configuration control unit 304 of the AP 102 performs control for independently managing the BSS1 network (circle 101 in FIG. 1) without control by the AP 105.

If it was possible to discover a peripheral AP (Yes in step S401), the process proceeds to step S402. In step S402, the wireless LAN control unit 301 determines whether or not the discovered peripheral AP supports multi-AP coordination operation (whether or not the discovered peripheral AP has a multi-AP coordination function). The wireless LAN control unit 301 can determine whether or not the peripheral AP supports multi-AP coordination operation based on an information element regarding capabilities or the like included in a frame received at the time of the operation for searching for the peripheral AP in step S401. As described above, in the case of the network configuration of FIG. 1, the AP 102 and the AP 105 support multi-AP coordination operation. If the peripheral AP does not support multi-AP coordination operation (NO in step S402), the process proceeds to step S403, and the selection unit 303 selects the Single-AP method, and ends the process.

If the peripheral AP supports multi-AP coordination operation (Yes in step S402), the process proceeds to step S404. In step S404, the wireless LAN control unit 301 determines whether or not the self AP (AP 102) and the peripheral AP can obtain CSI (Channel State Information) from all the STAs connected to these APs. In the case of the network configuration of FIG. 1, it is determined whether the AP 102 can obtain channel information with respect to the STA 106 in addition to with respect to the STA 103, and whether the AP 105 can obtain channel information with respect to the STA 103 in addition to with respect to the STA 106. The CSI can be obtained by a sounding procedure using an NDP (Null Data Packet) or a beamforming procedure. In a CSI Report field of an IEEE 802.11 standard, SNR (Signal-to-Noise Ratio) and CSI Matrix are defined as information that can be obtained by this process.

Here, an example of a condition under which CSI can be obtained will be described. The first condition is that a certain AP and all STAs connected to this AP and the peripheral AP are within a radio wave reach range. Note that in addition to merely a radio wave arriving, configuration may be taken to add a condition that an RSSI (Received Signal Strength Indicator) or a CQI (Channel Quality Indicator) is equal to or higher than a predetermined value. The second condition is that the STA can transmit data to another peripheral AP in a state where the STA is under the management of one AP. Here, the term "under the management" means that an Association (connection) of a standard of the IEEE 802.11 series is established. Thus, the function of establishing connections with a plurality of APs at the same time is called a Multi-AP Association function. Generally, the AP grasps whether or not an STA supports Multi-AP Association by exchanging an Information element relating to capabilities when the AP connects to the STA. Further, APs that support the multi-AP coordination operation can exchange therebetween information as to whether each terminal supports Multi-AP Association. A condition under which CSI can be obtained is not limited to the above first condition and/or the second condition, and other conditions may be used. For example, there is a condition that Implicit beamforming can be used. Implicit beamforming refers to beamforming without sounding by an NDP (treated as a predetermined channel state). Implicit beamforming can be made usable, for example, when a predetermined setting is made by a user via the input unit 204 (FIG. 2) or when an RSSI for communication with the communication partner apparatus is good. If the condition for using Implicit beamforming is met (if Implicit beamforming is available), the AP can process subsequent transmissions as if the AP was able to obtain a channel state having a predetermined value without sounding in accordance with an NDP.

If it is determined in step S404 that the CSIs of all the STAs can be obtained (Yes in step S404), the process proceeds to step S405, otherwise (No in step S404), the process proceeds to step S408. In the case of yes in step S404, a communication method that uses CSI is to be selected, and in the case of no in step S404, a communication method that does not use CSI is to be selected.

In step S405, the wireless LAN control unit 301 confirms the connection state between the AP 102 and the peripheral AP, and determines whether or not a high-speed connection is possible. Here, the state in which high-speed connection is possible means a state in which communication between the AP and the peripheral AP is possible independently without affecting communication between the AP and the STA. A first example of satisfying this state is that the backhaul 100 for communication between the AP and the peripheral AP is wired communication such as Ethernet (registered trademark) or xDSL (some kind of Digital Subscriber Line), or public wireless communication such as LTE (Long-Term Evolution) or WiMAX (Worldwide Interoperability for Microwave Access). A second example of satisfying this state is that the AP and the peripheral AP support Multi-band or Multi-channel (are connected via Multi-band or Multi-channel). Here, supporting Multi-band means being able to simultaneously communicate in a plurality of operating frequency bands of a wireless LAN. Thus, for example, communication using a 2.4 GHz band between the AP and the STA and using a 5 GHz band or a 6 GHz band between the AP and the peripheral AP is included. Here, supporting Multi-channel means being able to simultaneously communicate in a plurality of frequency channels of a wireless LAN. Therefore, for example, in the single band of the 5 GHz band, between the AP and the STA includes communication using four channels of W52 (36ch, 40ch, 44ch, 48ch), and between the AP and the peripheral AP includes communication using 11 channels of W56 (100ch, 104ch, . . . , 140ch).

If it is determined in step S405 that a high-speed connection is possible (Yes in step S405), the process proceeds to step S406. In step S406, the selection unit 303 selects the JTX (Joint Transmission) method as the multi-AP coordination configuration method, and ends the processing. If it is not determined in step S405 that a high-speed connection is possible (No in step S405), the process proceeds to step S407. In step S407, the selection unit 303 selects the null steering method as the multi-AP coordination configuration method, and ends the processing. It should be noted that null steering is sometimes referred to as a zero point forming of a beam.

If it is determined in step S404 that it is not possible to obtain the CSI of every STA (No in step S404), the processing proceeds to step S408. In step S408, the wireless LAN control unit 301 determines whether or not it is possible to adjust a communication schedule using a predetermined frequency band in time division. The wireless LAN control unit 301 can determine whether or not the communication schedule can be adjusted based on the information element regarding the capabilities exchanged with the peripheral AP. In addition, in the system, whether or not each AP can adjust the communication schedule may be set in advance. If it is determined that adjustment of the communication schedule is possible (Yes in step S408), the processing proceeds to step S409. In step S409, the selection unit 303 selects the schedule adjustment method as the multi-AP coordination configuration method, and ends the processing.

If it is determined in step S408 that adjustment of the communication schedule is not possible (No in step S408), the process proceeds to step S410. In step S410, the wireless LAN control unit 301 determines whether or not there is an interference limited STA (terminal). Here, an interference limited STA refers to an STA that is affected by communication from an AP to which the STA itself is not connected (also belongs to a network of another BBS that overlaps with a network of the BBS to which the STA itself belongs). In the case of the network configuration of FIG. 1, both the STA 103 and the STA 106 are interference limited STAs. An unaffected STA is referred to as a Non-Interference limited STA. For example, in FIG. 1, if the STA 106 is outside the BBS1 network (circle 101) and inside the BBS2 network (circle 104), the STA 106 becomes a non-interference limited STA. The wireless LAN control unit 301 can perform the determination of step S410 by receiving reports from the respective STAs that the position information and the strength/quality of a received frame are greater than or equal to a predetermined level. For example, when each STA receives, at strength/quality greater than or equal to the predetermined level, a frame from an AP (a network of another BSS) different from the AP to which the STA is connected (a network of a BSS to which the STA belongs), the STA can report the information to the AP to which the STA is connected. Further, it is assumed that the information is shared among the APs. The wireless LAN control unit 301 receives the information to thereby be able to perform the determination of step S410. An example of strength/quality is RSSI (Received Signal Strength Indicator).

If it is determined that there is an interference limited STA (Yes in step S410), the process proceeds to step S411. In step S411, the selection unit 303 selects the Coordinated OFDMA method as the multi-AP coordination configuration method, and ends the process. If it is determined in step S410 that there is no interference limited STA (No in step S410), the process proceeds to step S412. In step S412, the selection unit 303 selects the Fractional Coordinated OFDMA method as the multi-AP coordination configuration method, and ends the processing.

Figure 5:
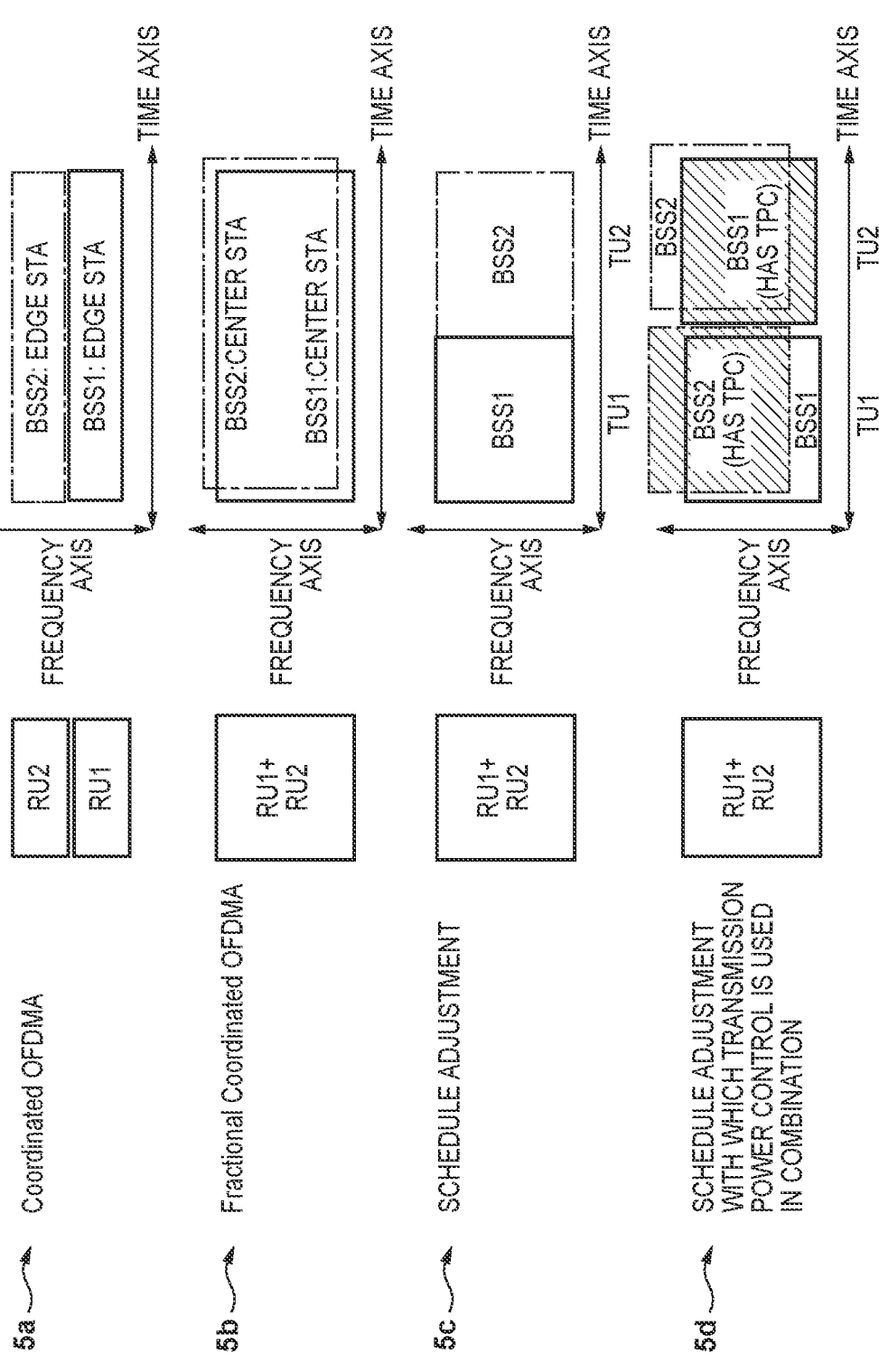
FIG. 5 shows schematic diagrams for describing configurations according to some multi-AP coordination methods.

Next, a configuration according to the multi-AP coordination method selected by the selection unit 303 will be described. FIG. 5 shows schematic diagrams for describing configurations according to some multi-AP coordination method, where an configuration 5a shows a Coordinated OFDMA configuration (step S411), An configuration 5b shows a Fractional Coordinated OFDMA configuration (step S412), and an configuration 5c shows a schedule adjustment configuration (step S409). An configuration 5d will be described later. Note that, as a notation common to the configurations 5a to 5d, the horizontal axis represents time and the vertical axis represents frequency. Here, the absolute section length of the time axis and the granularity/unit of time can vary depending on the use case of the multi-AP coordination configuration. For example, it may be set to be in milliseconds, seconds, or more numbers or units related to human sensitivities or operations, from the microseconds of a TU (Time Unit) of IEEE 802.11. The granularity and units of the frequency axis are, for example, RUs (Resource Unit) which are units of a frequency band of communication in OFDMA defined by IEEE 802.11ax. However, depending on the capabilities of the APs and the STAs, the granularity and units may be bands (frequency bands) that can be used in Multi-band communication or channels that can be used in Multi-channel communication. Solid line rectangles indicate the time axis/frequency region used by the AP 102 (BSS1 network), and dot-dash line rectangles indicate the time axis/frequency region used by the AP 105 (BSS2 network).

The configuration 5a shows a Coordinated OFDMA configuration. This configuration is realized by the Coordinated OFDMA configuration control unit 307. In this configuration, RUs are clearly separated between a plurality of BSSs (AP and STA). That is, the RUs used by the AP 102, the STA 103, the AP 105, and the STA 106 in communication do not overlap. Edge STA in FIG. 5A is synonymous with interference limited STA.

The configuration 5b shows a Fractional Coordinated OFDMA configuration. This configuration is realized by the Fractional Coordinated OFDMA configuration control unit 308. In this configuration, some or all of the RUs used between a plurality of BSSs (AP and STA) may overlap. In the drawings, two rectangles are shown staggered for the sake of clarity, but they may be completely overlapped with each other. Thus, Fractional means that the frequencies are not completely divided, i.e. that they are used in places (intermittently) as in OFDMA. In addition, "center STA" of FIG. 5B is a synonym for a non-interference limited STA.

The configuration 5c shows a schedule adjustment configuration. This configuration is realized by the schedule adjustment configuration control unit 309. In this configuration, the times of communication for the BSS1 network (AP 102 and the STA 103) and the BSS2 network (AP 105 and the STA 106) are clearly separated. That is, the BSS1 network and the BSS2 network use the same frequency band in time division. As described above, units for TU1 (Time Unit) and TU2 in the drawing may be any amount of time as long as they can be adjusted between APs.

According to the communication according to the configurations of FIGS. 5A to 5C, the time resource or the frequency resource (resource unit, band, channel) can be effectively used in accordance with coordination between the plurality of APs and the STA, which leads to efficient use of the wireless medium.

Figure 6:
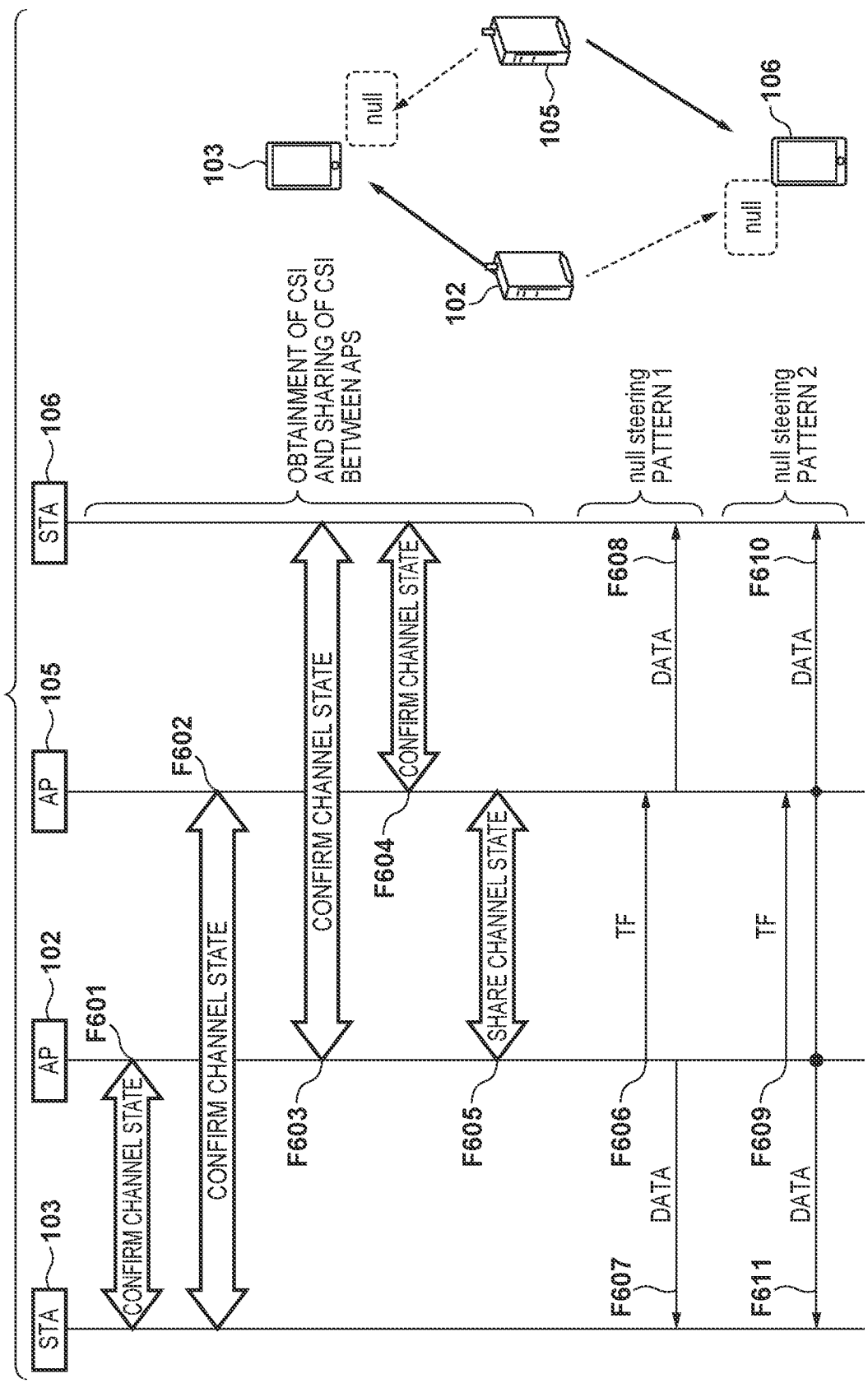
FIG. 6 is a sequence chart for describing channel state confirmation and a null steering configuration.

FIG. 6 is a sequence diagram for describing null steering configuration (step S407). This configuration is realized by the null steering configuration control unit 306. In this method, firstly each AP obtains the CSI of communication with the STA. F601 is a procedure of confirming the channel state between the AP 102 and the STA 103. As described above, as an example, the AP transmits an NDP, the STA estimates the channel state in response to reception of the NDP, and feeds back channel information as the CSI. Similarly, channel state confirmation procedures are executed for the AP 105 and the STA 103 at F602, for the AP 102 and the STA 106 at F603, and for the AP 105 and the STA 106 at F604. At F605, respective channel state confirmation information are exchanged and shared between the AP 102 and the AP 105. This information exchange also makes it possible for a plurality of APs to perform DL (downlink) MU (multi-user) operations from the AP to a plurality of STAs at the same time. Further, in the obtainment of the CSI, the state of transmission from an STA to an AP may also be confirmed. This information is used when performing an UP (uplink) MU (multi-user) operation from a plurality of STAs to an AP, as a multi-AP coordination operation.

Note that null steering configuration is sometimes referred to as Coordinated BF (Beam Forming) or Coordinated BF and Nulling because it directs a null point of the beam of beamforming.

Next, at F606, a null steering TF (Trigger Frame) is sent from the AP 102 to the AP 105. The TF is for measuring a timing the next transmission operation. Here, it is assumed that the negotiation of which of the AP 102 and the AP 105 transmits the TF is performed according to the procedure for F605. At F607 after the passage of an SIFS (Short Inter Frame Space) or after the passage of another predetermined amount of time after F606, a data frame addressed to the STA 103 is transmitted from the AP 102. Since this data frame is a null point of the beam for the STA 106, the data frame does not affect the reception operation of the STA 106. Similarly, a data frame addressed to the STA 106 is transmitted from the AP 105 at F608. This data frame has a null point for the beam at the STA 103, and thus does not affect the reception operation of the STA 103.

By communication according to this null steering configuration, the time resource or the frequency resource (resource unit, band, channel) can be used without division in accordance with coordination between the plurality of APs and the STA, which leads to efficient use of the wireless medium.

FIG. 7 is a sequence diagram for describing a JTX configuration (step S406). Here, the JTX configuration refers to a configuration in which a plurality of APs transmit data to one STA. This configuration is realized by the JTX configuration control unit 305. One wireless technology for realizing JTX is D-MIMO. Here, D-MIMO is an abbreviation of Distributed MIMO or Distributed MU MIMO. D-MIMO is a technique in which a plurality of access points communicate with one STA at the same time on the same channel (or OFDMA RU: Resource Unit) and realizes high-speed communication through multiplexed usage of space.

In the D-MIMO method, firstly each AP obtains the CSI of communication with the STA. This is similar to the processing for F601 to F604 of FIG. 6, and description thereof is omitted. Next, at F701, a procedure for deciding a master AP is executed between the AP 102 and the AP 105. A master AP is an AP that controls D-MIMO operation and is also referred to as an M-AP (master access point). An S-AP (slave access point) executes JTX under the control of the M-AP. In the present example, it is assumed that the AP 102 is decided as the master AP, and the AP 102 starts operation as the master AP at F702. Also, at F703, the AP 105 starts operation as the slave AP.

At F704, data is shared between the AP 102 and the AP 105 through the backhaul 100. By such communication via the backhaul, "communication between the APs" and "communication between the AP and the STA" can be performed in parallel. At F705, the AP 102 sends a JTX TF (Trigger Frame) to the AP 105. This JTX TF is for designating that transmission by the AP 105 be activated and a timing for when to do so. At F706, the AP 102 transmits data to the STA 106, and at F707, the AP 105 transmits data to the STA 106, where timings for F706 and F707 are synchronized. Similarly, the AP 102 transmits data to the STA 103 at F708, and the AP 102 transmits data to the STA 106 at F709, where timings for F708 and F709 are synchronized. Such synchronization is realized by a provision that transmission be performed after the passage of an SIFS (Short Inter Frame Space) of JTX TF. The specification of the transmission timing synchronization may include in the JTX TF an absolute amount of time or a relative time other than an SIFS. According to communication according to the JTX configuration, effective multiplex communication can be performed in one frequency band in a plurality of APs and STAs, and high-speed communication (high throughput communication) can be performed.

Configuration may be taken to transmit the same data at F706 and F708 or at F707 and F709. By coordinated operation of a plurality of APs in this manner, although the processing may be redundant, an effect of improving the reliability and stability of communication will arise.

<First Variation>

As an example of JTX, there is a case where one STA is a target of coordinated operation of a plurality of APs. The configuration shown in FIG. 1 corresponds to a case where the AP 102 and the AP 105 communicate with the STA 106 by D-MIMO. Referring to FIG. 7, at F710, the AP 102 sends to the AP 105 data that is actually to be transmitted by JTX.

At F711, the AP 102 sends a JTX TF (Trigger Frame) to the AP 105. At F712, the AP 105 transmits data to the STA 106. At F713, the AP 102 transmits data to the STA 106. Here, the timings of F712 and F713 are synchronized for similar reasons as described above.

Note that in this variation, the AP 102 does not need a channel state with respect to the STA 103. Therefore, configuration may be taken such that the determination in step S404 of FIG. 4 is based only on a condition relating to the AP 102 and the STA 106. Also, this variation does not exclude a connection between the AP 102 and the STA 103. Since the AP 102 is coordinated with the AP 105, it can communicate with the STA 103 at a timing when the AP 105 does not transmit. This operation may be performed by Single-AP configuration control unit 304. In addition, configuration may be taken to transmit respectively the same data at F712 and F713. By coordinated operation of a plurality of APs in this manner, although it is redundant, gives rise to an effect of improving the reliability and stability of communication.

<Second Variation>

TPC (Transmission Power Control) may be used in combination with the schedule adjustment configuration (step S409) described in the above embodiment. The configuration 5d in FIG. 5 illustrates a schematic diagram of a schedule adjustment method with which transmission output control is used in combination. The solid line rectangles in the diagram are the AP 102/BSS1 and the dashed-dotted lines are the AP 105/BSS2 areas to be used, respectively. The filled areas indicates that TPC is present. In the configuration 5d, the AP 102 that manages the BSS1 network sets the transmission power to a normal value in the TU1 section, and sets it to a value for limiting the transmission power in accordance with TPC in the TU2 section. The AP 105 that manages the BSS2 network sets the transmission power to a value limited by the TPC in the TU1 section, and sets the transmission power to a normal value in the TU2 section. Here, this transmission power control may be realized by applying a spatial reuse technique introduced from IEEE 802.11ax.

As described above, according to the embodiment described above, there is a contribution to the improvement of the use efficiency of the wireless medium, and the communication speed and the stability of the entire system and the individual communication apparatuses.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-075030, filed Apr. 10, 2019, which is hereby incorporated by reference herein in its entirety.

What is claimed is:

1. A communication apparatus, comprising:
   one or more processors; and
   one or more memories that store computer-readable instructions for causing, when executed by the one or more processors, the communication apparatus to:
   determine, in a case where one or more other communication apparatuses are capable of performing coordinated communication by using a predetermined frequency band, whether or not performing high-speed connection with the one or more other communication apparatuses each operating as an access point is possible; and
   select, on the basis that it is determined that it is possible to perform high-speed connection with the one or more other communication apparatuses each operating as an access point, a Joint Transmission (JTX) method.

2. The communication apparatus according to claim 1, wherein the computer-readable instructions further cause, when executed by the one or more processors, the communication apparatus to determine whether or not the communication apparatus and the one or more other communication apparatuses can obtain channel state information from a station,
   wherein, in a case where it is determined that the channel state information can be obtained, and it is determined that it is possible to perform high-speed connection with the one or more other communication apparatuses each operating as an access point, the communication apparatus selects the JTX method in which the communication apparatus and the one or more other communication apparatuses perform communication after confirming channel state information with respect to one communication partner apparatus.

3. The communication apparatus according to claim 2, wherein
   in a case where it is determined that the channel state information can be obtained, and it is determined that it is not possible to perform high-speed connection with the one or more other communication apparatuses each operating as an access point, the communication apparatus determines to use a null steering method in which the communication apparatus and the one or more other communication apparatuses perform communication after confirming channel state information with respect to respectively different stations.

4. The communication apparatus according to claim 2, wherein in a case where the communication apparatus and the one or more other communication apparatuses are connected via wired communication or public wireless communication, the communication apparatus determines that it is possible to perform high-speed connection with the one or more other communication apparatuses each operating as an access point.

5. The communication apparatus according to claim 2, wherein in a case where the communication apparatus and the one or more other communication apparatuses are connected via a Multi-band or a Multi-channel, the communication apparatus determines that it is possible to perform high-speed connection with the one or more other communication apparatuses each operating as an access point.

6. The communication apparatus according to claim 1, wherein the computer-readable instructions further cause, when executed by the one or more processors, the communication apparatus to:
  determine whether or not the communication apparatus and the one or more other communication apparatuses can obtain channel state information from a station; and
  determine whether the communication apparatus and the one or more other communication apparatuses are capable of schedule adjustment using the predetermined frequency band in time division between the communication apparatus and the one or more other communication apparatuses,
  wherein, in a case where it is not determined that the channel state information can be obtained and it is determined that the schedule adjustment is possible, the communication apparatus selects a schedule adjustment method.

7. The communication apparatus according to claim 6, wherein, in a case where it is not determined that the channel state information can be obtained and it is determined that the schedule adjustment is possible, the communication apparatus selects a schedule adjustment method with which transmission power control is used in combination and in which the communication apparatus and the one or more other communication apparatuses use the predetermined frequency band in time division after performing control to have respectively different transmission power.

8. The communication apparatus according to claim 1, wherein the computer-readable instructions further cause, when executed by the one or more processors, the communication apparatus to:
  determine whether or not the communication apparatus and the one or more other communication apparatuses can obtain channel state information from a station; and
  determine whether or not the station belongs to another network which is overlapped with the network to which the station belongs,
  wherein, in a case where it is not determined that the channel state information can be obtained and it is determined that the station belongs to the other network, the communication apparatus selects a Coordinated OFDMA (Orthogonal Frequency Division Multiple Access) method in which the frequency band is divided and used between the communication apparatus and the station.

9. The communication apparatus according to claim 8, wherein, in a case where it is not determined that the channel state information can be obtained and it is not determined that station belongs to the other network, the communication apparatus selects a Fractional Coordinated OFDMA method in which at least a part of the frequency band is overlapped and used between the communication apparatus and the one or more other communication apparatuses.

10. The communication apparatus according to claim 1, wherein the communication apparatus and the one or more other communication apparatuses are access points (APs) corresponding to a standard of an IEEE 802.11 series, and perform the coordinated communication by a multi-AP coordination configuration.

11. A method of controlling a communication apparatus, the method comprising:
  determining, in a case where one or more other communication apparatuses are capable of performing coordinated communication by using a predetermined frequency band, whether or not performing high-speed connection with the one or more other communication apparatuses each operating as an access point is possible; and
  selecting, on the basis that it is determined that it is possible to perform high-speed connection with the one or more other communication apparatuses each operating as an access point, a Joint Transmission (JTX) method.

12. A non-transitory computer-readable storage medium storing a computer program for causing a computer to execute a method of controlling a communication apparatus, the method comprising:
  determining, in a case where one or more other communication apparatuses are capable of performing coordinated communication by using a predetermined frequency band, whether or not performing high-speed connection with the one or more other communication apparatuses each operating as an access point is possible; and
  selecting, on the basis that it is determined that it is possible to perform high-speed connection with the one or more other communication apparatuses each operating as an access point, a Joint Transmission (JTX) method.

\* \* \* \* \*